United States Patent [19]
Cortese

[11] Patent Number: 5,634,394
[45] Date of Patent: Jun. 3, 1997

[54] ESPRESSO COFFEE MACHINE

[75] Inventor: Virginio Cortese, Turin, Italy

[73] Assignee: Essegielle S.r.l., Turin, Italy

[21] Appl. No.: 402,346

[22] Filed: Mar. 10, 1995

[30] Foreign Application Priority Data

| Mar. 11, 1994 | [IT] | Italy | TO94A0172 |
|---|---|---|---|
| Jul. 8, 1994 | [IT] | Italy | TO94A0561 |

[51] Int. Cl.⁶ .................................................. A47J 31/34
[52] U.S. Cl. ........................... 99/295; 99/302 R; 99/287
[58] Field of Search .................... 99/295, 300, 302 R, 99/302 P, 289 T, 289 R, 279, 285, 287, 293; 426/433

[56] References Cited

U.S. PATENT DOCUMENTS 2,887,038  5/1959  Rosander .
3,977,313  8/1976  Bieri .
4,426,919  1/1984  Rhoten .................................. 99/289 T
4,429,623  2/1984  Illy ........................................ 99/302 R

FOREIGN PATENT DOCUMENTS

| 496688 | 7/1992 | European Pat. Off. . |
| 2286627 | 4/1976 | France . |
| 1454200 | 11/1968 | Germany . |

*Primary Examiner*—Robert W. Jenkins
*Attorney, Agent, or Firm*—Quarles & Brady

[57] ABSTRACT

An espresso coffee machine wherein a percolator cup is fitted removably to a fixed tubular support and beneath a pressurized-hot-water supply conduit; the fixed tubular support housing a sealing element which is movable by the pressurized hot water towards the cup for connecting the conduit to the cup in fluidtight manner.

13 Claims, 2 Drawing Sheets

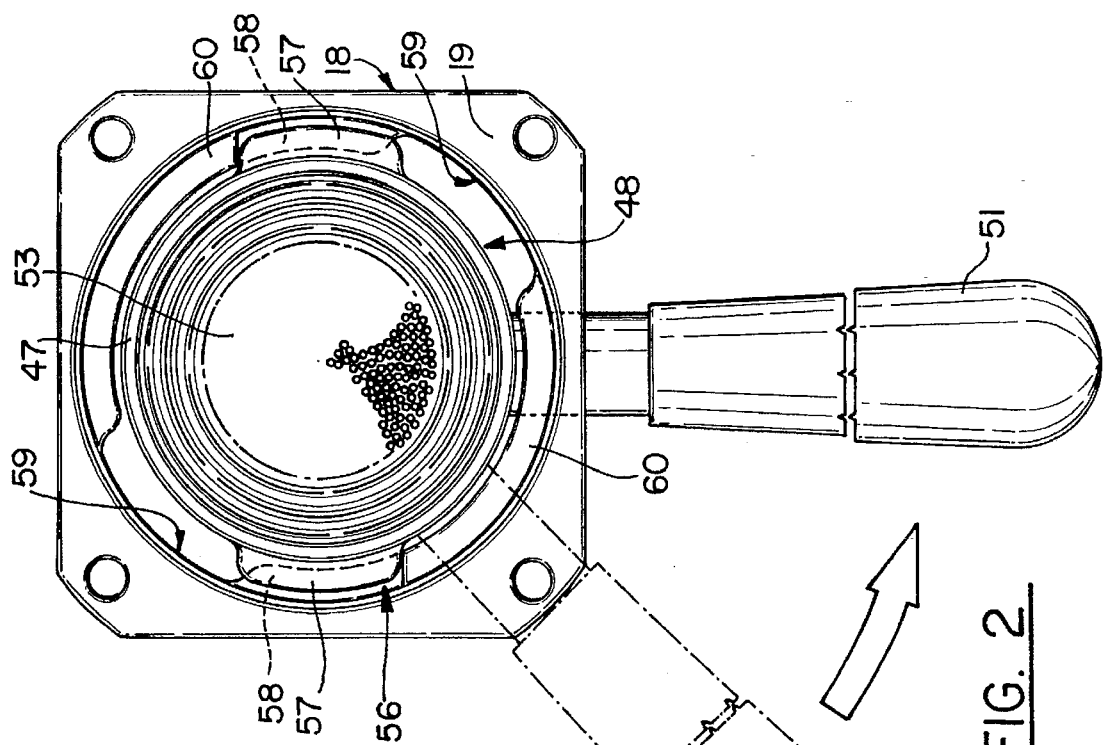
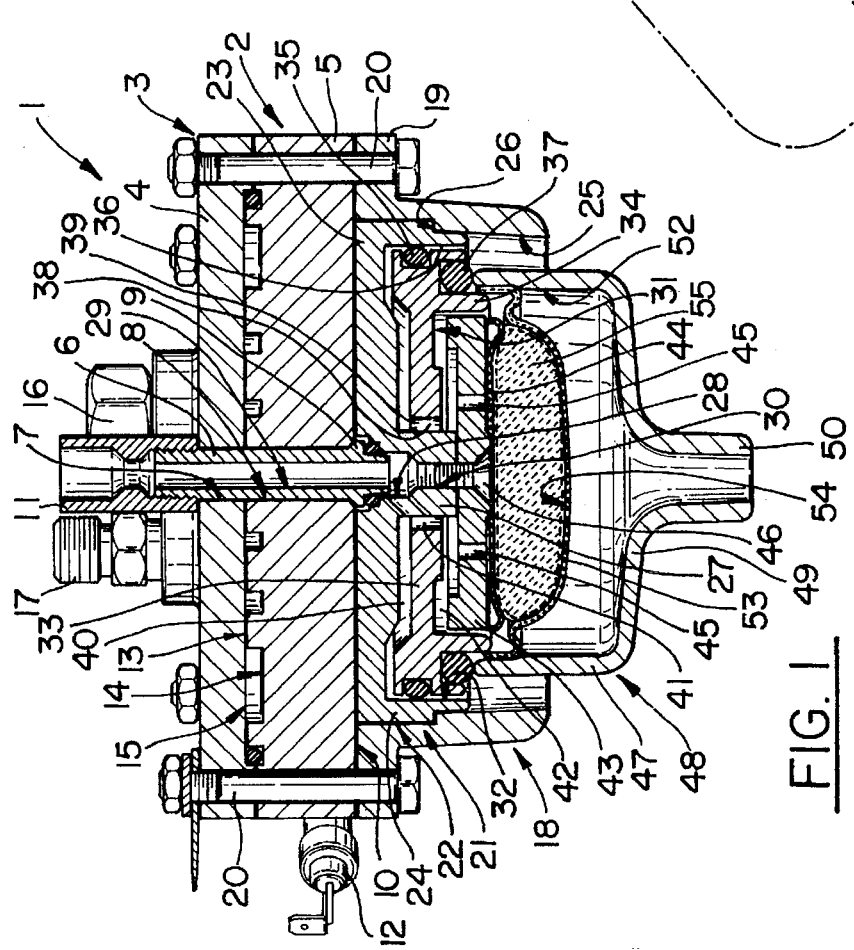
FIG. 2
FIG. 1

ESPRESSO COFFEE MACHINE

BACKGROUND OF THE INVENTION

The present invention relates to an espresso coffee machine.

On espresso coffee machines, ground coffee is placed inside a cup-shaped filter housed removably inside a percolator cup presenting at least one outflow conduit at the bottom, and connectable at the top, by means of a bayonet joint, to a tubular body or support surrounding the outlet of a hot-water supply device normally consisting of a boiler.

On known machines of the aforementioned type, to fit the cup inside the tubular support and tighten the bayonet joint, the cup is moved axially in relation to the tubular support, and the free edge of the cup is connected in fluidtight manner to a face seal fitted to the tubular support and surrounding the outlet of the hot-water supply device. Fluidtight connection of the cup to the tubular support provides for defining a mixing chamber divided by the filter into two parts, one communicating solely with the outlet of the hot-water supply device, and the other communicating solely with the bottom outflow conduit, so that the pressurized hot water from the supply device is forced to flow through the filter and the ground coffee inside it to reach the bottom outlet conduit.

Known machines of the aforementioned type present several functional and operating drawbacks. In particular, sealing of the mixing chamber is achieved by tightening the bayonet joint, which not only requires practice and a certain amount of effort on the part of the user, but also involves a varying angular position of the cup in relation to the tubular support, depending on the elastic reaction of the seal. In other words, no one precise position exists in which to fit the cup to the tubular support, and sealing of the mixing chamber is only ensured by exerting considerable effort which may even result in the cup jamming inside the support. Moreover, known machines of the above type only operate particularly well using loose ground coffee as opposed to cakes which differ in shape. As such, a machine designed to receive a certain type of cake may prove absolutely incapable of sealing the mixing chamber, and hence producing good quality espresso coffee, when a different type of cake is used.

SUMMARY OF THE INVENTION

It is an object of the present invention to provide a coffee machine wherein sealing of the mixing chamber is not only independent of the torque applied to the joint connecting the cup to the tubular body, but is also independent of the type of coffee or coffee cake employed.

According to the present invention, there is provided an espresso coffee machine comprising pressurized-hot-water supply means with an outlet; a fixed tubular support surrounding said outlet; a percolator cup; and connecting means for removably connecting the cup to the fixed tubular support and to said outlet; characterized in that it also comprises a sealing element housed in the fixed tubular support, facing the cup, and fitted through with said supply means; said sealing element being at least partly movable towards the cup by the pressurized hot water, so as to connect said supply means in fluidtight manner to the cup.

According to a preferred embodiment of the present invention, the above machine comprises a hydraulic cylinder extending at least partly along and integral with the tubular support; at least part of said sealing element forming the piston of said cylinder.

As such, sealing between the cup and the tubular support is guaranteed automatically by the thrust of the movable sealing element as opposed to the manner in which the cup is fitted to the tubular support, and is also guaranteed using any type of coffee cake, by virtue of the movable sealing element automatically adapting its movement to the thickness of the cake used.

BRIEF DESCRIPTION OF THE DRAWINGS

Two non-limiting embodiments of the present invention will be described by way of example with reference to the accompanying drawings, in which:

FIG. 1 shows an axial section, with parts removed for clarity, of a first embodiment of the espresso coffee machine according to the present invention;

FIG. 2 shows a plan view of a detail in FIG. 1;

DETAILED DESCRIPTION OF THE INVENTION

Figure 3:
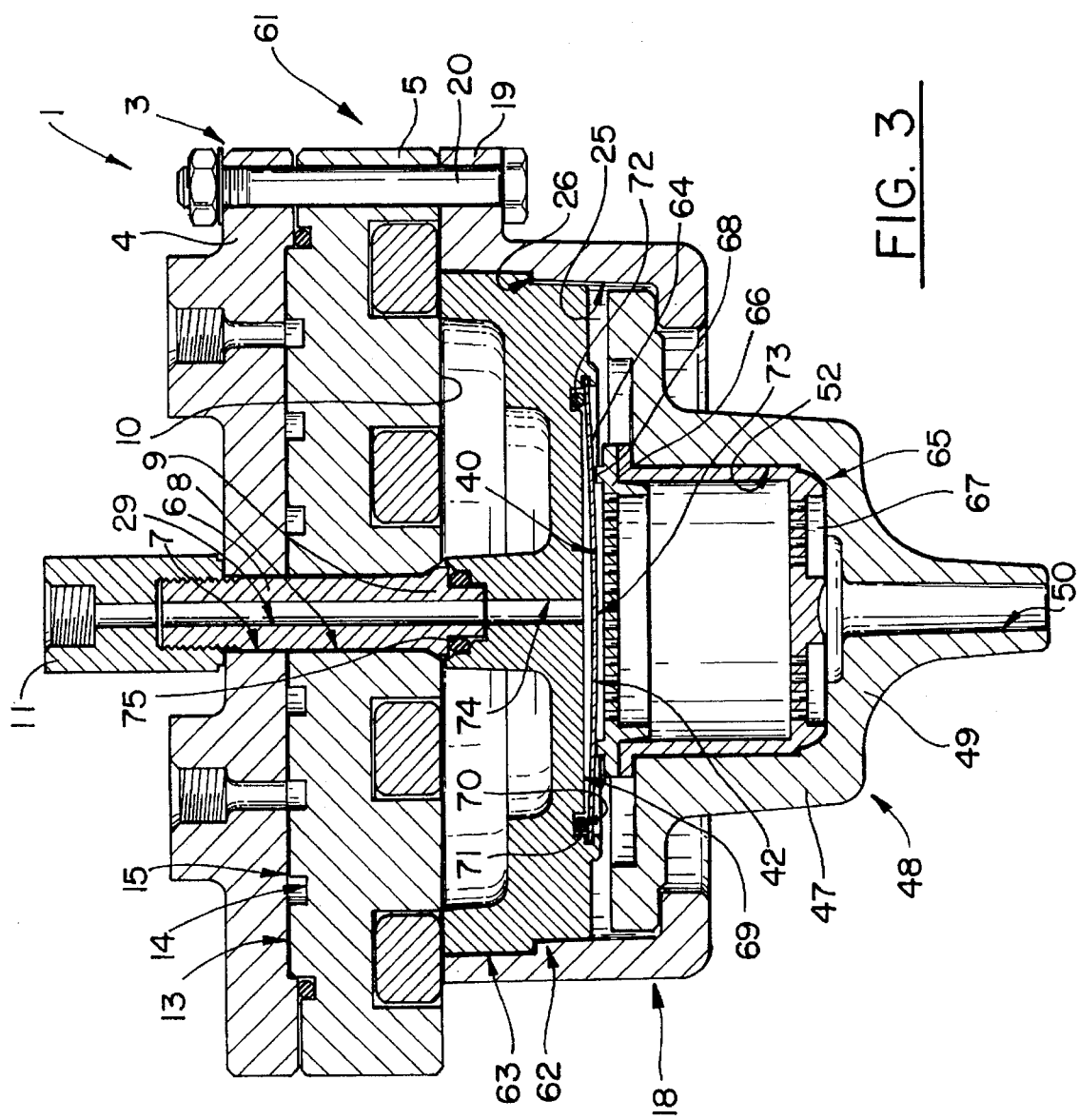
FIG. 3 shows an axial section, with parts removed for clarity, of a second embodiment of the espresso coffee machine according to the present invention.

Number 1 in FIG. 1 indicates an espresso coffee machine comprising an operating unit 2 in turn comprising a dry boiler 3 defined by two plates 4 and 5 arranged the first on top of the second, and connected to each other by a tubular tie 6 extending through coaxial holes 7 and 8 formed centrally through plates 4 and 5. Tie 6 presents, at the bottom, a head 9 connected to the bottom surface 10 of plate 5, and presents an externally threaded portion projecting from the top of plate 4 and fitted with a known type of fitting 11 acting, among other things, as a nut.

Plate 5 is fitted through with an electric heating resistor 12, and presents, on its top surface 13, a groove 14 closed at the top by plate 4 to define a heating coil 15 communicating in known manner (not shown) with an inlet fitting 16, a safety valve 17, and a drain fitting consisting of fitting 11.

From plate 5 there extends downwards a substantially cylindrical tubular body or support 18 coaxial with tie 6 and presenting an outer annular flange 19 contacting bottom surface 10 of plate 5 and connected to plates 4 and 5 by through bolts 20 parallel to tie 6.

Tubular support 18 houses a hydraulic cylinder 21, the cup-shaped outer shell 22 of which comprises an end wall 23 contacting surface 10, and a substantially cylindrical lateral wall 24 with its outer surface contacting the inner surface 25 of tubular support 18, and which is locked axially in relation to tubular support 18 by an annular shoulder 26 formed on inner surface 25 and mating with a corresponding shoulder formed on the outer surface of wall 24. From the central portion of wall 23, there extends downwards a substantially cylindrical appendix 27 presenting, together with wall 23, a through hole 28 which is coaxial and communicates with a conduit 29 defined by tie 6 and communicating with fitting 11, and presents a threaded bottom end portion 30.

Hydraulic cylinder 21 also comprises a cup-shaped piston 31 housed inside an inner chamber 32 of shell 22 and in turn comprising an end wall 33, from the periphery of which a substantially cylindrical lateral wall 34 extends downwards. Laterally, wall 34 presents an outer annular groove housing an annular seal 35 cooperating in fluidtight manner with the inner surface 36 of wall 24; and, frontally, wall 34 presents a downward-facing annular groove housing an annular seal 37 smaller in diameter than seal 35. Wall 33 presents a central hole 38 coaxial with tie 6 and housing appendix 27 in sliding and radially slack manner, so as to define, with the outer surface of appendix 27, an annular passage 39 between an annular chamber 40—defined between walls 33 and 23 and communicating with conduit 29 through holes 41 formed transversely in appendix 27—and an annular chamber 42 smaller in diameter than chamber 40. Chamber 42 is defined, inside wall 34, by a plate 43 fitted underneath with a trough 44 communicating with chamber 42 via axial holes 45 formed through plate 43. Together with trough 44, plate 43 is connected to the free end of appendix 27 by a screw 46 extending through trough 44 and plate 43 coaxially with tie 6, and engaging the threaded portion 30 of tie 6.

In use, the bottom portion of tubular support 18 is engaged by the top portion of a cylindrical lateral wall 47 of a percolator cup 48 which is closed at the bottom by a wall 49 presenting a central outflow conduit 50, and presents an external radial handle 51. Walls 47 and 49 define a mixing chamber 52 housing a cup-shaped filter 53, the peripheral annular edge of which rests on the free end edge of wall 47 which presents the same diameter as seal 37. Filter 53 is positioned facing trough 44 with which it defines a chamber 54 for housing a preformed coffee cake 55.

As shown in FIG. 2, cup 48 is connected to tubular support 18 by means of a bayonet joint 56 defined by two appendixes 57 projecting outwards from the top of wall 47, and by a flange 58 projecting inwards from surface 25 and presenting two slots 59 for the passage of respective appendixes 57. From surface 25, there also project two stop elements 60, each for arresting the travel of a respective appendix 57 along flange 58, so that handle 51 is arrested in a given fixed position in relation to tubular body 18 when cup 48 is fitted to the tubular body.

In actual use, after placing a cake 55 inside filter 53, cup 48 is fitted to tubular support 18 by positioning it beneath support 18 so that appendixes 57 are aligned facing slots 59; by moving cup 48 upwards so that appendixes 57 are above flange 58; and by rotating cup 48 in relation to tubular support 18 until appendixes 57 are arrested against stop elements 60.

In connection with the above, it should be pointed out that, when cup 48 is rotated in relation to tubular support 18, machine 1 has not yet been activated, so that the contact pressure between cup 48 and seal 37 is relatively small, as is the torque required to position appendixes 57 against stop elements 60 which provide for positioning cup 48 in a precise angular position in relation to tubular support 18.

At this point, machine 1 is activated to supply pressurized water, in known manner not shown, to inlet fitting 16 of boiler 3, and to activate resistor 12; and the pressurized hot water from boiler 3 flows along conduit 29 and through holes 41 into cylinder 21, and through chambers 40 and 42 to trough 44, i.e. to the inlet of chamber 54. Due to the larger cross section of chamber 40 in relation to chamber 42 and chamber 54, cylinder 21 acts as a hydraulic press, and piston 31 is moved down to connect seal 37 with a specific relatively high pressure to the free edge of cup 48; at which point, the water is mixed in the usual known manner with the ground coffee inside filter 53.

In connection with the above, it should be pointed out that, in view of the elasticity of seal 37, the stroke of piston 31 may vary within a given range, while at the same time still ensuring fluidtight sealing of mixing chamber 54. Consequently, if a cake 55 is used, sealing is ensured for cake thicknesses within the same range.

The FIG. 3 embodiment relates to an operating unit 61, any parts of which structurally and/or functionally similar to corresponding parts of unit 2 are indicated using the same numbering system.

The main difference between units 61 and 2 consists in hydraulic cylinder 21 and plate 43 being replaced by a simplified hydraulic cylinder 62 presenting a shell 63 housed in a fixed position inside tubular support 18, and a piston defined by a flexible metal blade 64. Moreover, trough 44 and filter 53 are dispensed with, and chamber 54 houses a rigid, substantially cylindrical cake 65 containing a quantity of ground coffee and closed at either end by two perforated walls 66, 67 respectively defining a trough and filter. Moreover, wall 66 is surrounded by an annular rib 68 which, when cake 65 is housed inside cup 48, projects beyond the free edge of cup 48 and cooperates in fluidtight manner with a central portion of blade 64 to define an end portion of cylinder 62.

Shell 63 is substantially cylindrical, is locked axially in relation to support 18 by shoulder 26, and presents, at the end facing cup 48, a substantially cylindrical cavity 69 coaxial with shell 63 and in turn presenting a bottom surface with a peripheral annular groove 70, and a cylindrical lateral surface with an intermediate annular groove 71. Groove 71 is engaged by a peripheral edge of blade 64 which cooperates frontally with a seal 72 housed inside groove 70, to define, inside cavity 69, chamber 40. At the same time, rib 68 cooperates with blade 64 to define, between blade 64 and wall 66, chamber 42 which communicates with chamber 40 via a hole 73 formed centrally through blade 64 and forming the outlet of boiler 3. Chamber 40 in turn communicates with conduit 29 via a hole 74 formed axially through shell 63 and connected in fluidtight manner to conduit 29 via the interposition of a seal 75.

Operation of unit 61 is easily deducible from that of unit 2, and therefore requires no further explanation.

I claim:

1. An espresso coffee machine comprising pressurized-hot-water supply means (3) with an outlet (44) (73); a fixed tubular support (18) surrounding said outlet (44) (73); a percolator cup (48); connecting means (56) for removably connecting the cup (48) to the fixed tubular support (18) and to said outlet (44) (73); and a sealing element (31) (64) housed in the fixed tubular support (18), facing the cup (48); said supply means (3) extending through said sealing element (31) (64); and sealing element (31) (64) being at least partly movable towards the cup (48) by the pressurized hot water, so as to connect said supply means (3) in fluidtight manner to the cup (48).

2. The machine claimed in claim 1, further comprising a hydraulic cylinder (21) (62) extending at least partly along and integral with the tubular support (18); at least part of said sealing element (31) (64) being mounted for movement along said cylinder (21) (62) to define a piston (31) (64) of said cylinder (21) (62).

3. The machine claimed in claim 2, wherein said piston (31) defines, inside said hydraulic cylinder (21), a first (40) and second (42) chamber communicating with each other; the first chamber (40) communicating with said supply means (3); and the second chamber (42) communicating with the cup (48).

4. The machine claimed in claim 3, wherein the second chamber (42) has a smaller cross section than the first chamber (40).

5. The machine claimed in claim 4, further comprising a face seal (37) fitted to said piston (31) and surrounding said outlet (44); the cup (48) having an annular edge mating, in use, in fluidtight manner with said face seal (37).

6. The machine claimed in claim 5, wherein said cylinder (21) comprises a lateral wall (24); said piston (31) being provided with a lateral seal (35) interposed between the piston (31) and said lateral wall (24) and larger in diameter than said face seal (37).

7. The machine claimed in claim 5, wherein said outlet (44) is defined by a trough (44) fitted to said piston (31) and surrounded by said face seal (37).

8. The machine claimed in claim 2, wherein said outlet (73) is formed through the piston (64).

9. The machine claimed in claim 8, wherein said piston (64) comprises a deformable metal blade (64) supported by said cylinder (62); lock means (71) being provided for axially locking the outer peripheral edge of the blade (64) in relation to the cylinder (62).

10. The machine claimed in claim 9, wherein said outlet (73) is formed through a central portion of said blade (64); the cup (48) housing a rigid cake (65) having an annular front rib (68) projecting, in use, from the cup (48) towards said blade (64) and cooperating, in use, in fluidtight manner with said central portion of the blade (64).

11. An assembly comprising a machine (1) as claimed in claim 10, and a rigid, replaceable cake (65) housed removably inside the cup (48) of the machine (1) and containing a quantity of ground coffee; the cake (65) having a perforated front wall (66), and an annular front rib (68) surrounding said perforated front wall (66) and cooperating, in use, in fluidtight manner with said central portion of said blade (64).

12. The assembly claimed in claim 11, wherein said annular rib (68) and said perforated front wall (66) define a portion closing said cylinder (62); the piston (64) defining, inside the cylinder (62), a first and second chamber (40, 42) communicating with each other via said outlet (73); and the second chamber (42) being defined externally by said rib (68) and having a smaller cross section than said first chamber (40).

13. The machine claimed in claim 1 or 2, wherein said connecting means (56) comprise a bayonet joint (56) interposed between the cup (48) and the tubular support (18) and comprising stop means (60) for arresting the cup (48) in a predetermined angular position in relation to the tubular support (18).

* * * * *